July 1, 1930.  O. H. DICKE  1,768,750

MECHANICAL VIBRATING RECTIFIER

Filed March 8, 1922

INVENTOR
O.H. Dicke

Patented July 1, 1930

1,768,750

UNITED STATES PATENT OFFICE

OSCAR H. DICKE, OF ROCHESTER, NEW YORK, ASSIGNOR OF ONE-HALF TO ALLEN A. DICKE, OF MONTCLAIR, NEW JERSEY

MECHANICAL VIBRATING RECTIFIER

Application filed March 8, 1922. Serial No. 541,969.

This inventinon relates to rectifiers, and particularly to mechanical rectifiers of the vibrating type.

In changing alternating current to a pulsating current, it is usually also necessary to transform the alternating current from one voltage to a different voltage which will give the desired pulsating voltage. In mechanical rectifiers of the vibratory type, it is necessary to vibrate a reed or armature substantially in phase with the voltage to be rectified, and since the magnetism lags ninety electrical degrees behind the voltage producing it in a highly inductive circuit, suitable additional means must be provided to cause proper vibration of the reed. Generally speaking, at least two methods may be employed, namely, by producing a magnetism which is substantially in phase or in time phase opposition with the voltage, or by tuning the reed or armature to a lower frequency than that of the alternating current, whereby the reed will be forced to a higher frequency, thereby causing it to lag behind the force or magnetism causing its movement. If the latter method of synchronizing the reed with the voltage is employed, a much stronger force, or magnetic field, is necessary to cause the same amplitude of vibration of a particular reed.

With the above and other considerations in mind, the principal objects and purposes of the present invention contemplate the provision of means for causing a magnetic field which lags substantially one hundred and eighty degrees behind the voltage producing it, and therefore is substantially in phase opposition with said voltage; to combine the flux of said field with a permanent flux, and provide a reed or armature in the combined field of flux which will vibrate at the same frequency as the voltage to be rectified; to provide an efficient transformer having a substantially closed core; to provide means to prevent sparking; and to combine the several devices in a manner to form an efficient, durable and light device, which may be cheaply constructed.

Other objects and advantages of the invention will appear as the description progresses.

In describing the invention in detail, reference will be made to the accompanying drawing, in which:—

Figure 1:
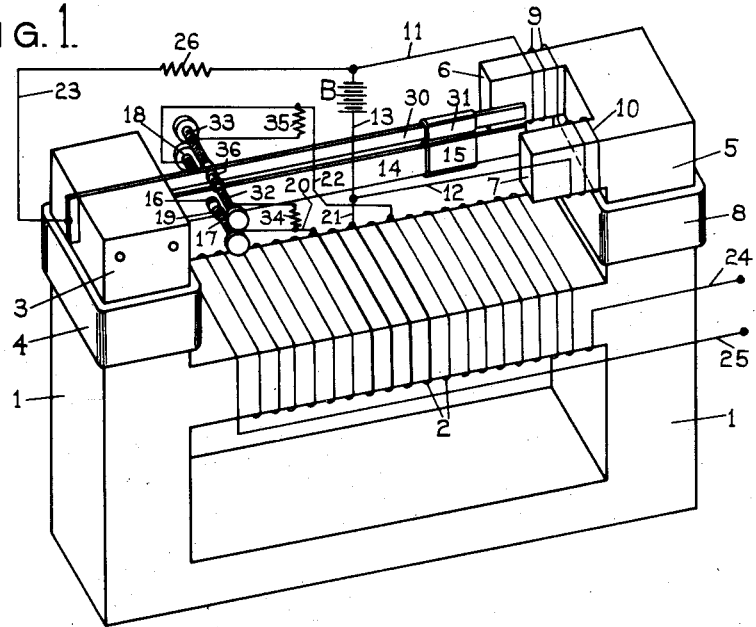
Figure 2:
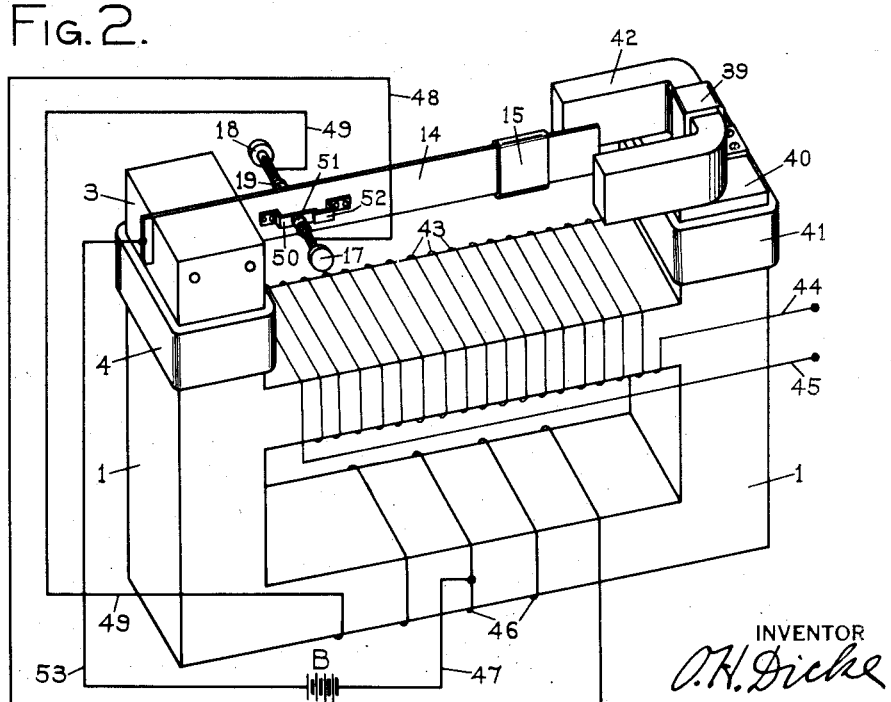

Fig. 1 shows a diagrammatic and perspective view of one embodiment of the present invention; and Fig. 2 illustrates a modified form of the invention in a similar manner.

In general Fig. 1 illustrates a combined transformer and rectifier, in which the flux for actuating the reed or armature is caused to lag substantially ninety electrical degrees behind the magneto-motive-force indirectly producing it, which magneto-motive-force lags substantially ninety electrical degrees behind the voltage supplied to the winding of the transformer. This is accomplished by providing shading or bucking coils on core members, or extensions, connecting said transformer and rectifier.

Structure of Fig. 1.—More specifically Fig. 1 illustrates a transformer comprising a rectangular core 1 constructed of suitable laminated transformer iron having a winding 2 wound on the top member thereof. This top member of the core is preferably larger in cross-sectional area than the lower member so that this part of the core 1 will not be saturated as highly as the rest of the core. On one end of the winding 2 the core 1 is provided with an upstanding projecting or extension 3, having a shading coil 4 comprising a band of suitable conducting material contained thereon. On the opposite end of the winding 2 the core is provided with another extension 5 of general L shape, having one member thereof bifurcated to form poles 6 and 7. This extension 5 is likewise provided with a shading coil 8 similar to the coil 4. The magnet pole 6 is provided with a winding 9, and the pole 7 is provided with a winding 10, these windings being connected so that one of the poles forms a north magnetic pole while the other forms a south pole when these windings are connected to a battery or other source of direct current supply. These windings are preferably connected in series, because by so connecting them the voltage induced in one of these windings, due to a change of flux leaking from the transformer through extension 5, will be neutralized by the voltage induced in the other winding.

The circuit for energizing the windings 9 and 10 may be traced as follows:—Beginning at the battery B, wire 11, coil 9, coil 10, wires 12 and 13 back to the battery B.

The other extension 3, which is also made of laminations of transformer iron, has a portion of several laminations omitted to form a slot in which the reed or armature 14 is securely fastened. The reed is constructed of a suitable magnetic material which has the necessary stiffness and a relatively high elastic limit. Near the free end of the reed is provided a sleeve 15 comprising a band of magnetic material snugly fitting around the reed. This sleeve serves as an armature, and also facilitates the tuning of the reed to the desired frequency. This may be done by sliding the sleeve to a point to give the proper period of oscillation to the reed, and then fastening the sleeve in any suitable manner.

Near the opposite end of the reed and on opposite sides thereof are contacts 16 of suitable non-fusible material, such as platinum, coin-silver, tungsten-steel or the like. Adjacent these contacts 16 are provided adjustable stationary contact screws 17 and 18 provided with contact tips 19 of similar non-fusible material. These contact screws are threaded into suitable insulated supports (not shown).

The winding 2 is provided with taps 20, 21, and 22. The middle tap 21 is connected to one terminal of the battery B through the wire 13, while the tap 20 is connected to the contact screws 17, and the tap 22 is connected to contact screws 18. The reed 14 is connected to the other terminal of the battery B by a wire 23.

In addition to the reed 14 adapted to cooperate with contact screws 17 and 18, another reed 30 having a tuning sleeve 31 is provided. Adjustable contact screws 32 and 33 are provided with which the reed 30 through the contact 36 of non-fusible material is adapted to contact. These contact screws 32 and 33, having non-fusible contact points, are threaded into suitable insulated supports (not shown), and are electrically connected to the contact screws 17 and 18 by resistances 34 and 35, respectively. These contacts are provided to eliminate sparking by being adjusted to break contact an instant later than contacts cooperating with reed 14, thereby making the final break through a resistance, this retarded break being preferably accomplished by tuning the reed 30 to lag slightly behind reed 14.

*Operation of Fig. 1.*—Let us assume that the rectifier is connected to the battery B as illustrated, and that the winding 2 is connected to a suitable source of alternating current by the lead wires 24 and 25. The transformer being designed to have a rather high flux density causes a tendency for the flux to leak through the extensions 3 and 5. On account of the provision of the shading coils 4 and 8, a heavy demagnetizing current is set up around the extensions, thus allowing a resultant flux which passes through the air gap between the extension 3 and poles 6 and 7 which will lag substantially ninety electrical degrees behind the magneto-motive-force due to the alternating current winding 2, thus bringing this flux substantially in phase with the counter E. M. F. induced in the winding 2. The combination of this flux with the continuous flux due to the current flowing in coils 9 and 10 causes the reeds 14 and 30 to vibrate at the frequency of the alternating current. The contact screws 17 and 18 are adjusted a suitable distance from the contacts 16 on the reed 14, and the sleeve 15 is preferably adjusted so that the reed is properly tuned when vibrating between the contacts.

It should be noted that by tuning the reed so that its natural frequency is equal to the frequency of the alternating current when said reed vibrates between the contact screws 17 and 18 that it will have a very high period when in operation, but that when it is started from rest its natural frequency or period of vibration is lower, due to the fact that its pivot point has been brought back to its point of support at the extension 3. It has been found that by certain arrangements of parts, the reed would vibrate at a very high period if once started, but that its period when started from rest would be insufficient to cause it to strike one of the contact screws to change it to its other and higher natural period.

In the design and construction of a rectifier embodying the invention illustrated in Fig. 1, the various parts are arranged and proportioned so that the reed will be approximately tuned to the frequency of the alternating current when contacting with the contact screws, and when started from rest by the application of alternating current, will vibrate to an amplitude high enough to strike the contact screws 17 and 18. The reed 30 is tuned in a similar manner. When the reed 14 is vibrating between the contact screws 17 and 18, the turns of the winding 2 between taps 20 and 21, and taps 21 and 22, will be alternately connected across the battery B, the coils 9 and 10 being so connected to the battery B that the current rectified will be in the proper direction.

Assuming that the voltage induced in the turns between taps 20 and 21 is in the direction toward tap 21 when the reed 14 contacts with contact screw 17. Under these conditions, a current will flow as follows:—From tap 21, wire 13, battery B, ballast resistance 26, wire 23, reed 14, contact screw 17, tap 20, through a portion of the winding 2 back to the tap 21.

Assuming now that the second wave of a cycle is transpiring. At this time the reed will contact with contact screw 18, and current will flow through a circuit which may be traced as follows:—Beginning at tap 21, wire 13, battery B, ballast resistance 26, wire 23, reed 14, contact screw 18, tap 22, through another portion of winding 2 back to the tap 21. The ballast resistance 26 may be omitted if desired, but has been found advantageous to prevent sparking, especially when starting the rectifier, for the reed 14 may not be in synchronism with the alternating current before its full amplitude is obtained. It should be noted that the reed 30 is tuned to lag slightly behind the reed 14. This causes the current to be finally broken by the reed 30, and since the current has been much reduced by the resistance 34 or 35, there will be very little or no sparking.

It should be understood that it is not essential to provide shading coils that have an extremely low resistance, good results having been obtained with coils of medium resistance; and further it should be understood that the flux for vibrating reed 14 need not be precisely in phase with the voltage to be rectified, although it is desirable to have them very nearly in phase. A slight leading of the flux (lag of less than 180 degrees) is preferable, because the reed will tend to leg behind the flux operating it. Further, some forcing of the reed by tuning it to a natural period of vibration a little lower than that of the alternating current when the rectifier is in operation may be employed if desired.

*Structure of Fig. 2.*—In Fig. 2 has been illustrated a modified form of the present invention, which is in many respects like the form illustrated in Fig. 1. The core 1, extension 3, shading coil 4, reed 14 having a sleeve 15, and contact screws 17 and 18 being substantially the same have been given the same reference characters. In this form an extension 40 provided with a shading coil 41 and having a permanent magnet 42 secured to the end thereof by a clamp 39 is provided. On the top member of the core 1 is provided a primary winding 43 having lead wires 44 and 45 adapted to be connected to a suitable source of alternating current, and on the bottom member is wound a secondary winding 46 provided with a middle tap 47 and lead wires 48 and 49. On each side of the reed 14 is riveted an initially tensioned spring contact (only one being shown) comprising a spring member 50, provided with a contact point 51 of non-fusible material, having its one end riveted to the reed 14 and having its free end biased to initial tension by the hook or stop 52 riveted to the reed. The spring member 50 in itself is very yieldable, but due to the fact that it is held in a biased position by the stop 52, a sufficient force is present to give the desired contact pressure when it is further biased by contacting with one of the contact screws 17 or 18. An initially tensioned spring contact is desirable for two reasons. First, the contact pressure is practically the same, regardless of the distance the spring is moved from the stop, this being desirable to prevent interference with the free vibration of the reed; and second, the spring with its contact point can not vibrate independently of the reed, thereby assuring a single make and break of the circuit for each cycle of operation.

*Operation of Fig. 2.*—In this embodiment of the invention, the reed 14 is tuned by positioning the sleeve 15 at a point so that its natural period of vibration is the same as that of the alternating current supplied to the lead wires 44 and 45, when the contact screws are adjusted to the proper position. In this embodiment of the invention, no trouble is experienced in starting the rectifier into operation for the natural period of oscillation of the reed when operating at a small amplitude is substantially the same as when operating at its final or operating amplitude. When the winding 43 is energized by alternating current, the leakage flux through the extensions 3 and 40 combined with the flux due to the permanent magnet 42 causes the reed to vibrate in synchronism with the alternating current.

Assuming that the first wave of a cycle of voltage is induced in the secondary winding in a direction toward the lead wire 48 at the time the reed is in contact with the contact screw 17. Under this condition, a current will flow through the following circuit:—beginning at the winding 46, lead wire 48, contact screw 17, reed 14, wire 53, battery B, tap 47 back to the winding 46.

During the second wave of said cycle, a current will flow as follows:—beginning at the winding 46, lead wire 49, contact screw 18, reed 14, wire 53, battery B, tap 47 back to the winding 46. Good results have been obtained with the secondary winding on a separate part of the core as illustrated. This is attributed partly to the bucking action caused by the secondary winding, and partly to closer phase relation obtained between the voltage induced in this secondary winding and the flux which actuates the reed.

Having thus described several embodiments of the present invention, I desire to have it understood that various changes can be made without departing from the spirit and scope thereof, for instance, either rectifying element may be employed with either one of the transformers illustrated.

What I desire to secure by Letters Patent is:—

1. In a rectifier for changing alternating current to pulsating uni-directional current comprising, a core, means for setting up an alternating magneto-motive-force in said core, means acted upon by said magneto-motive-force for producing a flux lagging behind said magneto-motive-force, and a vibratory reed actuated by said lagging flux.

2. In a rectifier of the vibratory type comprising, means for producing an alternating flux, means for causing one component of said flux to lag behind the rest of said flux, and rectifying apparatus actuated by said lagging flux.

3. The combination with a transformer comprising, a substantially closed core having a winding thereon, members of magnetizable material extending from said core forming an air gap, a closed electrical conducting path surrounding one of said members and having an alternating current induced therein, and of rectifying apparatus operated by the flux in said air gap.

4. The combination with a transformer comprising, a substantially closed core, a portion of said core having a larger cross-section than the rest of said core, a winding energized by alternating current on said portion, extensions associated with said core forming an air gap, shading coils associated with said extensions for causing the flux passing through said extensions to lag behind the main flux produced by said current, and rectifying means in said air gap.

5. A device of the character described, comprising a transformer having the usual closed core of a laminated magnetic material winding on said core, legs of laminated magnetic material projecting from the core at the ends of said winding, shading coils on said legs and rectifying means operated in response to the flux passing through said shading coils.

6. In a combined transformer and rectifier comprising a core forming two multiple magnetic circuits having a common portion, a transformer winding on said common portion, one of said magnetic circuits having an air gap therein, means for causing a phase displacement between the fluxes in said magnetic circuits, and circuit controlling means actuated by the flux in said air gap.

7. The combination in current rectifying apparatus of a transformer including input and output leads and having a closed main path for magnetic flux and a shunt path for magnetic flux having an air gap therein, the two paths only being coincident in the portion covered by the transformer winding, and means for causing a phased displacement between the fluxes in said main path and said shunt path.

8. The combination in a current rectifying apparatus comprising, a core having an air gap, means for producing a magnetic flux in said air gap, means actuated by the flux in said air gap for interrupting a circuit, and other means for inserting a non-conductive resistance in said circuit just before it is interrupted.

9. A device of the character described, comprising a transformer having the usual closed core of laminated magnetic material, a transformer winding on said core, a shunt magnetic flux path for the passage of part of the flux passing through said winding, a shading coil on said shunt path, and rectifying means operated by flux passing through said shading coil.

10. Apparatus for transforming electric currents, in combination with a transformer having a leakage flux field, means for changing the phase relation of said leakage flux with respect to that of the total flux of said transformer, and a movable armature in said leakage flux field.

11. Apparatus for transforming electric currents comprising, a vibratory armature, means for vibrating said armature in synchronism with alterating current to be transformed, means for making and breaking a circuit in synchronism with said armature, and means for increasing the resistance of said circuit without increasing its inductive reactance just before the same is broken.

12. Apparatus for transforming electric currents comprising, means for producing flux substantially in synchronism with alternating current to be transformed, and a plurality of differently tuned armatures operatively associated with said flux producing means.

13. Apparatus for transforming alternating current into pulsating uni-directional current comprising, two magnetic circuits having a common portion, a winding energized by an external alternating current source of supply on said common portion, one of said magnetic circuits having an air gap therein, a closed conducting circuit linking the magnetic circuit having an air gap therein, and an armature in said air gap tuned to the frequency of said source of supply vibrated in response to magnetism produced by the current flowing in said winding and the current induced in said closed conducting circuit.

14. Apparatus for transforming alternating current into uni-directional pulsating current comprising, an armature, a winding having an alternating current potential applied thereto, means associated with said winding for causing a magneto-motiveforce and resulting flux which lags considerably behind the alternating current potential, means for causing another flux produced by said magneto-motive-force to act on said armature which flux lags considerably behind the magneto-motive-force, the various devices being so corelated and having such constants that the flux acting on said armature lags more than ninety electrical degrees behind the alternating potential applied to said winding.

15. In a device for producing an alternating current flux having a predetermined phase relation with respect to an alternating current potential comprising, a closed core of magnetic material, a winding energized from an alternating current source of supply surrounding the magnetic circuit of said closed core, a partial magnetic circuit in multiple with the portion of said closed core not provided with the winding and having a portion common to said closed core, and means associated with said partial magnetic circuit for causing the flux passing through said partial magnetic circuit to lag behind the flux passing through that part of the closed core not containing the winding, the constants of the various magnetic circuits and said means being so chosen that the flux in said partial magnetic circuit lags more than ninety electrical degrees behind the alternating potential applied to said winding.

16. Apparatus for transforming alternating current into pulsating uni-directional current comprising, two magnetic circuits having a common portion, a winding energized by an external alternating current source of supply on said common portion, one of said magnetic circuits having an air gap therein, a closed conducting circuit linking the magnetic circuit having an air gap therein, and having an alternating current induced therein, a direct current source of energy for energizing said closed conducting circuit, and an armature in said air gap vibrated in response to magnetism produced by the current induced in said winding and the uni-directional current flowing in said closed conducting circuit.

17. Apparatus for transforming alternating current into uni-directional pulsating current comprising, an armature, a winding having an alternating current potential applied thereto, means for causing a uni-directional magneto-motive-force to act on said armature, means associated with said winding for causing an alternating magneto-motive-force and resulting alternating flux which lags considerably behind the alternating current potential, means for causing another alternating flux produced by said alternating flux to act on said armature which another alternating flux lags considerably behind the first mentioned alternating flux, the various devices being so corelated and having such constants that the flux acting on said armature lags more than ninety electrical degrees behind the alternating potential applied to said winding, and contacts operated by said armature.

18. In an alternating current rectifier, the combination with a transformer including the usual closed core having a winding thereon which is energized by alternating current setting up an alternating current magneto-motive-force therein which lags considerably behind the alternating current potential impressed on said winding, a partial magnetic circuit including a portion common to the closed core, means associated with the partial magnetic circuit for causing an alternating flux therein which lags considerably behind the flux in said closed core, means for also producing uni-directional flux in said partial magnetic circuit in response to uni-directional current, and an armature operated jointly by said uni-directional flux and the alternating flux in said partial magnetic circuit.

19. Rectifying means for changing alternating current to pulsating uni-directional current comprising, an armature having a movable contact associated therewith, a stationary contact, said armature having a natural period of vibration substantially equal to the frequency of the alternating current to be rectified when it is vibrated to an amplitude to cause engagement of said movable and stationary contact, and means for producing a flux which is substantially in phase opposition with the potential of said alternating current including a closed circuit loosely coupled with a winding having an alternating current potential applied thereto from the source of alternating current to be rectified.

20. A rectifier for changing alternating current to pulsating uni-directional current comprising, means for producing an alternating flux including a core of magnetizable material, means for causing one component of said flux to lag behind the rest of said flux, and vibratory commutating means actuated by the lagging component of said alternating flux.

21. In a rectifier of the type in which alternating current is commutated into a pulsating uni-directional current by vibratory circuit closing and interrupting means in which the circuit is interrupted at such point or points of the alternating potential so that very little sparking occurs by reason of such interruption, the combination of an armature tuned to the frequency of said alternating potential having a contact associated therewith, a stationary contact adapted to be engaged by a contact on said armature, and means for producing a flux for operating said armature which has the necessary phase relation with the alternating current to be rectified to produce sparkless commutation which includes phase displacing means for causing only lagging of the flux.

22. A rectifier for changing alternating current to pulsating uni-directional current comprising, means for producing an alternating flux including a core of magnetizable material, means for causing one component of said flux to lag behind the rest of said flux, an armature adapted to be vibratorily operated by in response to the lagging component of said flux, and circuit closing means operated by said armature.

23. A static phase shifter comprising two magnetic paths having a bridge in common, means for creating magnetic flux in said paths, means associated with at least one path for displacing the phase of the flux in one path with respect to the flux in the other path, and a winding inductively related to said bridge.

24. A static phase shifter comprising two magnetic paths having a bridge in common, means for creating magnetic flux in said paths, a circuit of low resistance inductively related with one said path for displacing the phase of the flux in said one path with respect to the flux in the other path, and a winding inductively related to said bridge.

25. A static phase shifter comprising two magnetic paths having a bridge in common, means for creating in said two paths magnetic fluxes which flow in opposite directions in said bridge at a given instant, means associated with at least one path for displacing the phase of the flux in one path with respect to the flux in the other path, and a winding inductively related to said bridge.

26. A static phase shifter comprising two magnetic paths, means for creating magnetic flux in said paths, means associated with at least one such path for displacing the phase of the flux in one path with respect to the flux in the other path, and a winding arranged to be linked by the vector sum of the fluxes in said paths.

27. In combination, a winding on a core, a bridge on said core, means for supplying an alternating electro-motive force to said winding to create a periodic flux in said core, a coil on said bridge, and means for displacing the relative phases of the fluxes in said bridge and said core so that the electromotive force induced in said coil is out of phase with respect to said first electromotive force.

28. In combination, a primary winding, means for supplying an alternating electromotive force to said winding to create periodic flux therein, two magnetic paths each linked by said winding, a secondary winding linking one of said paths but not the other path, and means for displacing the relative phases of the fluxes in said two paths, so that electromotive force induced in said secondary winding is out of phase with respect to said first electromotive force.

In testimony whereof I hereto affix my signature.

OSCAR H. DICKE.